Patented Aug. 28, 1934

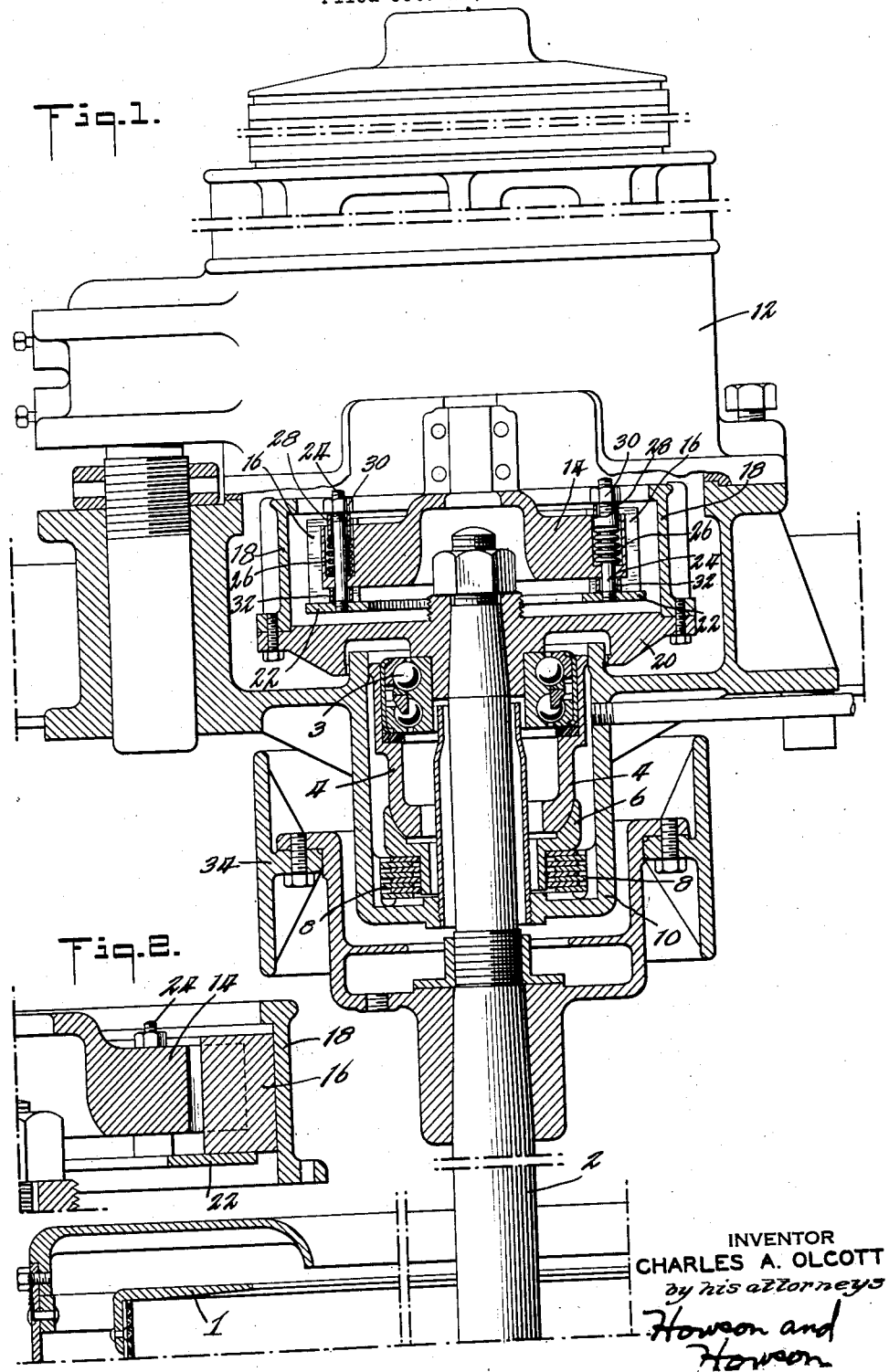

1,972,047

UNITED STATES PATENT OFFICE 1,972,047

CENTRIFUGAL FRICTION CLUTCH

Charles A. Olcott, Montclair, N. J.

Application October 21, 1931, Serial No. 570,229

21 Claims. (Cl. 192—105)

This invention relates to clutches and more particularly to centrifugally operated clutches for centrifuges and it is an object of this invention to provide a clutch of improved construction in which provision is made to permit oscillation of the basket during operation without placing undue strain upon the motor shaft or bearings. A furher object of this invention is to provide an improved clutch of the type described in which the centrifugally operated blocks are supported from the clutch spider in such manner as to be free to move with respect to the clutch spider.

In the drawing—

Figure 1 is a broken view, partly in elevation and partly in vertical section of a centrifuge having a clutch constructed in accordance with this invention; and Figure 2 is a fragmentary vertical section through the spider of the centrifugal clutch shown in Fig. 1; the section being taken at an angle to the section of Fig. 1 and showing a centrifugally operated clutch block on its support.

In the drawing the invention is shown in connection with a centrifugal device comprising a basket 1 supported by its driving shaft 2. The driving shaft 2 is mounted upon a bearing constructed as shown in my Patent No. 1,443,844, issued January 30, 1923 and comprising ball bearings 3 which are supported in a housing 4, the lower end of which is shaped to form a ball and socket joint with a socket 6 supported upon washers 8 carried by a suspension head 10. A motor 12, supported upon the suspension head 10, drives the shaft 2 by means of a centrifugal friction clutch comprising a spider 14 fixed to and driven by the motor armature shaft and blocks 16 driven by the clutch spider 14 and which, under the influence of centrifugal force, engage with a clutch ring 18 attached to a clutch plate 20 mounted upon the upper end of the shaft 2. The clutch blocks 16 are supported upon a carrier plate 22 supported by bolts 24 which extend through openings in the spider 14 and are yieldingly supported therein by springs 26 which engage the spider 14 and are retained on the bolts 24 by sleeves 28 and nuts 30. Spacing sleeves 32 limit the movement of the plate 22 toward the spider 14. Attached to the shaft 2 is the usual brake pulley 34.

If, while the basket is being rotated, something occurs to throw the basket slightly out of balance, the basket will swing to one side, a movement permitted by the mounting of the shaft 2 in the suspension head 10 as set forth in my patent referred to above. Such a movement of the basket 1 lowers one side of the clutch plate 20 and clutch ring 18 and the clutch blocks 16 at that side, being held against the clutch ring 18 by centrifugal force, move with the clutch ring 18 forcing down the plate 22 and compressing the springs 26 at that side of the clutch. Providing the yieldingly mounted plate 22 permits of this movement of the clutch blocks 16 and relieves the motor shaft and bearings of the excessive stresses to which they would be subjected if the blocks 16 were mounted directly upon the spider 14 and held against movement with the clutch ring 18 when the basket 1 becomes unbalanced while operating. The mounting of the blocks 16 upon the plate 22 also provides a support for the blocks 16 which travels with the blocks as the basket is being started so that the blocks 16 wear only on their vertical faces which engage the clutch ring 18 and thus retain their shape and balance for longer periods.

The springs 26 are so designed and the nuts 30 so adjusted that the springs 26 will not be further compressed by the unbalancing of the basket occurring during loading as at that time the motor speed is low and the centrifugal force acting upon the clutch blocks 16 is not great thus permitting the clutch ring 18 to shift with respect to the blocks 16.

What is claimed is:—

1. In a clutch, a driving member, a driven member and means for establishing connection between said members, said means being carried by one of said members and moved with respect thereto while held fixed with respect to the other of said members upon change in the alignment of the axes of said members.

2. In a clutch, a driving member, a driven member and means operated by centrifugal force for establishing operative connection between said members, said means being carried by said driving member and moved with respect thereto while held fixed with respect to said driven member upon change in the alignment of the axes of said members.

3. In a clutch, a driving member, a driven member and means operated by centrifugal force for establishing operative connection between said members, said means being yieldingly supported by one of said members and moved with respect thereto while held fixed with respect to the other of said members upon change in the alignment of the axes of said members when the clutch is in operation.

4. In a clutch, a driving member, a driven member and means operated by centrifugal force for establishing operative connection between said members, said means being yieldingly supported by said driving member when said clutch is in operation and freely movable under centrifugal force.

5. In a clutch, a driving member, a driven member, supporting means, means yieldingly supporting said supporting means from said driving member and means carried by said first mentioned supporting means and freely movable under centrifugal force to establish operative connection between said members.

6. In a clutch, a driving member, a driven member, a supporting plate, resilient means connecting said plate and said driving member and blocks carried by said plate and operable by centrifugal force to establish operative connection between said members.

7. In a clutch, a driving member, a driven member, a supporting plate, resilient means supporting said plate from said driving member, blocks mounted on said supporting plate and operated by centrifugal force when rotated by said driving member to establish operative connection between said members and means to adjust said resilient means.

8. In a centrifugally operated clutch, a clutch spider, a clutch ring, blocks driven by said spider and adapted to engage said ring under centrifugal force and means supporting said blocks from said spider whereby said blocks may remain fixed with respect to said clutch ring upon relative angular movement of the axes of rotation of said spider and ring when said clutch is in operation.

9. In a centrifugally operated clutch, a clutch spider, a clutch ring, blocks driven by said spider and freely movable under centrifugal force to engage said ring and means yieldingly supporting said blocks from said spider to permit oscillation of said blocks relative to said spider by said clutch ring.

10. In a centrifugally operated clutch, a clutch spider, a clutch ring, blocks driven by said spider and freely movable under centrifugal force to engage said ring and means supporting said blocks from said spider whereby said blocks may be shifted by said clutch ring when said clutch is in operation.

11. In a centrifugally operated clutch, a clutch spider, a clutch ring, blocks driven by said spider and adapted to engage said ring under centrifugal force and a carrier plate yieldingly supported by said spider and supporting said blocks.

12. In a centrifugally operated clutch, a clutch spider, a clutch ring and blocks yieldingly supported by said spider and freely movable under centrifugal force to engage said ring.

13. In a clutch, a clutch spider, a clutch ring surrounding said spider and blocks supported from said spider and adapted to remain fixed with respect to said ring upon relative angular movement of the axis of rotation of said spider and ring when said clutch is in operation.

14. In a clutch, a driving member, a driven member, blocks operated by said driving member and freely movable under centrifugal force to engage said driven member, means yieldingly supporting said blocks from said driving member for oscillation with said driven member when said clutch is in operation and means to adjust the resistance of said blocks to oscillation with said driven member.

15. In a clutch, a driving member, a driven member, blocks operated by said driving member and freely movable under centrifugal force to engage said driven member, resilient means supporting said blocks from said driving member for oscillation with said driven member when said clutch is in operation and means to vary the speed of rotation of said driving member at which said blocks begin to oscillate with said driven member.

16. In a clutch, a driving member, a driven member, means operated by centrifugal force to connect said members, and yielding means supporting said centrifugally operated means from said driving member, said centrifugally operated means overcoming the resistance of said supporting means to move bodily with respect to said driving member upon a change in the angular relation of the axes of said members when said centrifugally operated means is held to said driven member by centrifugal force.

17. In a clutch, a driving member, a driven member, means operated by centrifugal force to connect said members, and yielding means supporting said centrifugally operated means from said driving member, said supporting means yielding when said centrifugally operated means is held by centrifugal force for rotation in a plane perpendicular to the axis of said driven member upon change in the angular relation of the axes of said members.

18. In a clutch, a driving member, a driven member, means operated by centrifugal force to connect said members, and yielding means supporting said centrifugally operated means from said driving member, said supporting means yielding to permit relative angular movement of the axis of said members when said centrifugally operated means is held in a plane perpendicular to the axis of said driven member upon change in the angular relation of the axes of said members during rotation.

19. In a clutch, a driving member, a driven member, centrifugally operated blocks for connecting said driving and driven members, a plate supporting said blocks and means yieldingly supporting said plate from said driving member, said plate supporting means yielding when said blocks are held by centrifugal force for rotation in a plane perpendicular to the axis of said driven member.

20. In a clutch, a driving member, a driven member and means for establishing connection between said members, said members being movable to place their axes in different angular relations and said means being carried by one of said members and movable bodily with the other of said members upon a change in the angular relation of said axes when the clutch is in operation.

21. In a clutch, a driving member, a driven member, and means for establishing connection between said members, said members being relatively oscillatable to place their axes in different angular relations and said means being carried by one of said members and oscillatable as a whole with the other of said members.

CHARLES A. OLCOTT.